(12) United States Patent
Yoshida et al.

(10) Patent No.: US 11,105,465 B2
(45) Date of Patent: Aug. 31, 2021

(54) PRESSURE VESSEL

(71) Applicant: Mitsubishi Chemical Corporation, Chiyoda-ku (JP)

(72) Inventors: Keigo Yoshida, Tokyo (JP); Tadahiro Nishimoto, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/677,819

(22) Filed: Nov. 8, 2019

(65) Prior Publication Data

US 2020/0072416 A1 Mar. 5, 2020

Related U.S. Application Data

(63) Continuation of application No. PCT/JP2018/017756, filed on May 8, 2018.

(30) Foreign Application Priority Data

May 11, 2017 (JP) .............................. JP2017-094738

(51) Int. Cl.
*F17C 1/16* (2006.01)
*F17C 1/04* (2006.01)
*B29C 49/02* (2006.01)

(52) U.S. Cl.
CPC .................. *F17C 1/16* (2013.01); *F17C 1/04* (2013.01); *B29C 49/02* (2013.01)

(58) Field of Classification Search
CPC ...... F17C 1/16; F17C 1/06; F17C 1/04; F17C 1/02

(Continued)

(56) References Cited

U.S. PATENT DOCUMENTS 2,744,043 A * 5/1956 Ramberg ............. B29D 22/003
156/155
3,047,191 A * 7/1962 Young .................. B29D 22/003
220/588

(Continued)

FOREIGN PATENT DOCUMENTS

JP       3-89098 A    4/1991
JP       9-242990 A    9/1997
(Continued)

OTHER PUBLICATIONS

International Search Report dated Jul. 31, 2018 in PCT/JP2018/017756 filed on May 8, 2018 (with English translation).

(Continued)

*Primary Examiner* — Robert J Hicks
(74) *Attorney, Agent, or Firm* — Oblon, McClelland, Maier & Neustadt, L.L.P.

(57) ABSTRACT

A pressure vessel including: a cylindrical straight body section and dome sections provided at both ends of the body section, where: the body section and the dome sections are composed of a resin main body, and an outer shell made of a fiber reinforced resin material, the outer shell being on the outside of the main body; each of dome sections has pinch-off regions extending from a tip of the dome section toward the body section; and when an end of each of the pinch-off regions opposite to the tip of the dome section is located in a region where a distance from the tip of the dome section to the end of each of the pinch-off regions opposite to the tip of the dome section in the axial direction of the straight body section is less than a distance from the tip of each of the dome sections to a boundary between the straight body section of the main body and each of the dome sections in the axial direction of the straight body section.

7 Claims, 4 Drawing Sheets (58) Field of Classification Search
USPC .................. 220/586, 589, 588, 581; 206/0.6
See application file for complete search history.

(56) References Cited

U.S. PATENT DOCUMENTS

| | | | | |
|---|---|---|---|---|
| 3,508,677 | A * | 4/1970 | Laibson | ............. B29C 66/7392 220/590 |
| 3,843,010 | A * | 10/1974 | Morse | ....................... F17C 1/06 220/590 |
| 6,737,132 | B1 * | 5/2004 | Michihata | ................. B32B 1/02 428/35.7 |
| 7,407,062 | B2 * | 8/2008 | Carter | .................... B29C 70/086 220/590 |
| 8,038,029 | B2 * | 10/2011 | Lindner | .................... F17C 1/16 220/588 |
| 2001/0045433 | A1 * | 11/2001 | Ellis | ....................... B32B 27/34 220/562 |
| 2009/0022918 | A1 | 1/2009 | Matsuoka et al. | |
| 2011/0220659 | A1 | 9/2011 | Strack | |
| 2018/0080607 | A1 * | 3/2018 | Van Haaren | ............ F16J 12/00 |
| 2018/0156388 | A1 * | 6/2018 | Kampf | ...................... F17C 1/06 |

FOREIGN PATENT DOCUMENTS

| | | |
|---|---|---|
| JP | 2016-203443 A | 12/2016 |
| WO | WO 2007/086336 A1 | 8/2007 |

OTHER PUBLICATIONS

Japanese Office Action dated Aug. 13, 2019 in Japanese Patent Application No. 2018-530166 (with English translation), 7 pages.

\* cited by examiner

FIG. 5

PRESSURE VESSEL

This application is a continuation application of International Application No. PCT/JP2018/017756, filed on May 8, 2018, which claims the benefit of priority of the prior Japanese Patent Application No. 2017-094738, filed May 11, 2017, the content of which is incorporated herein by reference.

TECHNICAL FIELD

The present invention relates to a pressure vessel.

BACKGROUND ART

For example, as a fuel tank mounted on vehicles such as automobiles, or as a tank used for storage and transportation of natural gas or hydrogen gas, a pressure vessel formed of a resin main body (liner) reinforced with an outer shell made of a fiber reinforced resin material is used because of its lightness in weight and excellent strength. Examples of reinforcing fibers used for the outer shell include glass fibers and carbon fibers. Among these, carbon fibers are suitably used for transportation tanks for natural gas or hydrogen or pressure accumulators because carbon fibers have high specific strength and are suitable for weight reduction of the pressure vessels.

An example of known pressure vessels is one having a resin main body having a cylindrical straight body section and hemispherical dome sections provided at both ends of the straight body section, and an outer shell formed on the outside of the main body (Patent Document 1). The main body is generally formed by direct blow molding, rotational molding, injection molding, extrusion molding, followed by joining the molded products. The outer shell is formed by winding a fiber reinforced resin material formed of long reinforcing fiber bundles impregnated with a matrix resin around the outside of the main body by filament winding method (hereinafter referred to as FW method), followed by curing the resin material.

In a main body formed by the direct blow molding method, generally, a part of a parison is interposed between a pair of molds to form a pinch-off region extending linearly in the axial direction of the vessel. Since a part of the resin in the pinch-off region is constrained by the molds, the pinch-off region is caused to have a part having a different thickness from the other regions, so that a part where the pinch-off line extends in the axial direction tends to be thin. Thus, in the pinch-off region of the main body, the part where the pinch-off line is located becomes thin, so that the strength of the main body tends to decrease. Therefore, it is required that the number of usable cycles of the pressure vessel is increased, and it is important that the pressure vessel has excellent durability.

As a method of suppressing the strength decrease at the pinch-off region, there is a method of increasing the thickness of the main body. However, the main body with an increased thickness makes it difficult to reduce the weight of the pressure vessel, and results in reduction of the internal capacity of the pressure vessel, so that the operational performance as the pressure vessel is lowered and the cost performance is lowered. When the main body is thinned in consideration of weight reduction and internal capacity, durability is sacrificed. Therefore, it is difficult to simultaneously achieve weight reduction and secure internal capacity and durability.

PRIOR ART REFERENCES

Patent Document

Patent Document 1: Japanese Unexamined Patent Application, First Publication No. Hei 3-89098

DISCLOSURE OF INVENTION

Problems to be Solved by the Invention

An object of the present invention is to provide a pressure vessel that is light in weight and has a sufficient internal capacity as well as excellent durability.

Means to Solve the Problems

The present invention has the following configurations.

[1] A pressure vessel comprising: a cylindrical straight body section, and dome sections which are provided at both ends of the straight body section and narrow as distance from the straight body section increases,
wherein:
the straight body section erred the dome sections are composed of a resin main body, and an outer shell formed of a fiber reinforced resin material including a reinforcing fiber and a matrix resin, the outer shell being provided on the outside of the resin main body;
each dome section of the main body has pinch-off regions extending from a tip of the dome section toward the straight body section; and
when a distance from the tip of the dome section to a boundary between the straight body section of the main body and the dome section in an axial direction of the straight body section is 1,
an end of each of the pinch-off regions opposite to the tip of the dome section is located in a region where a distance from the tip of the dome section to the end of each of the pinch-off regions opposite to the tip of the dome section in the axial direction of the straight body section is less than a distance from the tip of each of the dome sections to a boundary between the straight body section of the main body and each of the dome sections in the axial direction of the straight body section.

[2] The pressure vessel according to [1], wherein a distance ratio between the tip of the dome section to the end of each of the pinch-off regions opposite to the tip of the dome section in the axial direction of the straight body section and the tip of each of the dome sections to the boundary between the straight body section of the main body and each of the dome sections in the axial direction of the straight b section is up to ⅞,

[3] The pressure vessel according to [1] or [2], wherein the main body is a direct blow molded product.

Effect of the Invention

The pressure vessel according to [1] or [2], wherein the main body is a direct blow molded product.

Effect of the Invention

The pressure vessel of the present invention is lightweight and has a sufficient capacity, and also has excellent durability.

DESCRIPTION OF THE EMBODIMENTS

The pressure vessel of the present invention includes: a cylindrical straight body section, and dome sections which are provided at both ends of the straight body section and narrow as distance from the straight body section increases. The straight body section and the dome sections are composed of a resin main body, and an outer shell formed of a fiber reinforced resin material including a reinforcing fiber and a matrix resin, the outer shell being provided on the outside of the resin main body. That is, in the pressure vessel of the present invention, the resin main body is reinforced by the outer shell formed of the fiber reinforced resin material.

Each of the dome sections of the main body has a pinch-off region extending from a tip of the dome section toward the straight body section. An end of each of the pinch-off regions opposite to the tip of the dome section is located in a region where a distance from the tip of the dome section to the end of each of the pinch-off regions opposite to the tip of the dome section in the axial direction of the straight body section is less than a distance from the tip of each of the dome sections to a boundary between the straight body section of the main body and each of the dome sections in the axial direction of the straight body section.

Explanations are made below with respect to an example of the pressure vessel of the present invention referring to FIG. 1 to FIG. 5. Further, the dimension and the like of the figures illustrated in the following explanations are mere examples, and the present invention is not necessarily limited thereto and can be practiced with appropriate modifications which do not affect the gist of the present invention.

Figure 1:
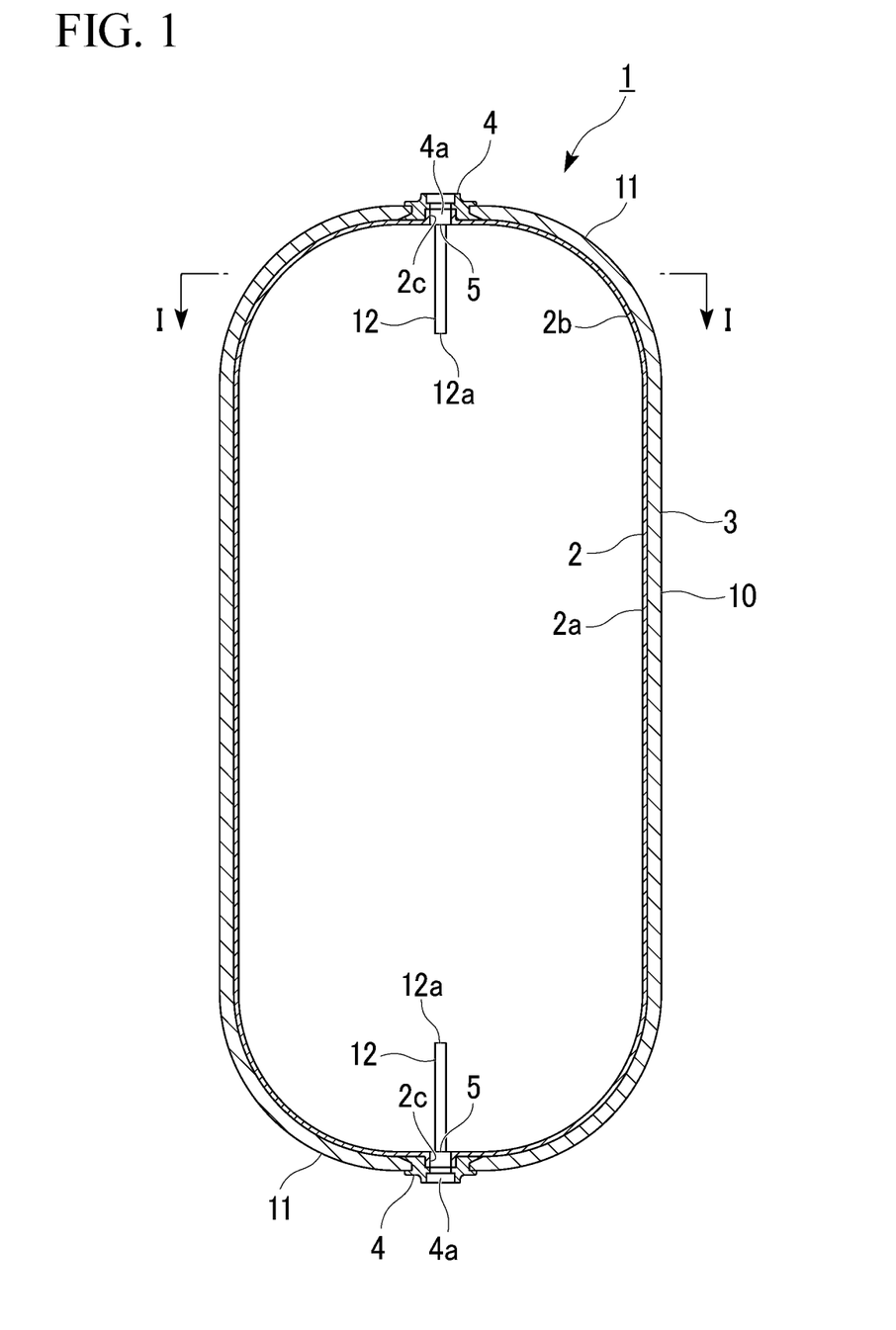
FIG. 1 is a diagram showing an example of a pressure vessel according to the present invention, and shows a cross section cut along an axial direction of a straight body section thereof.
Figure 2:
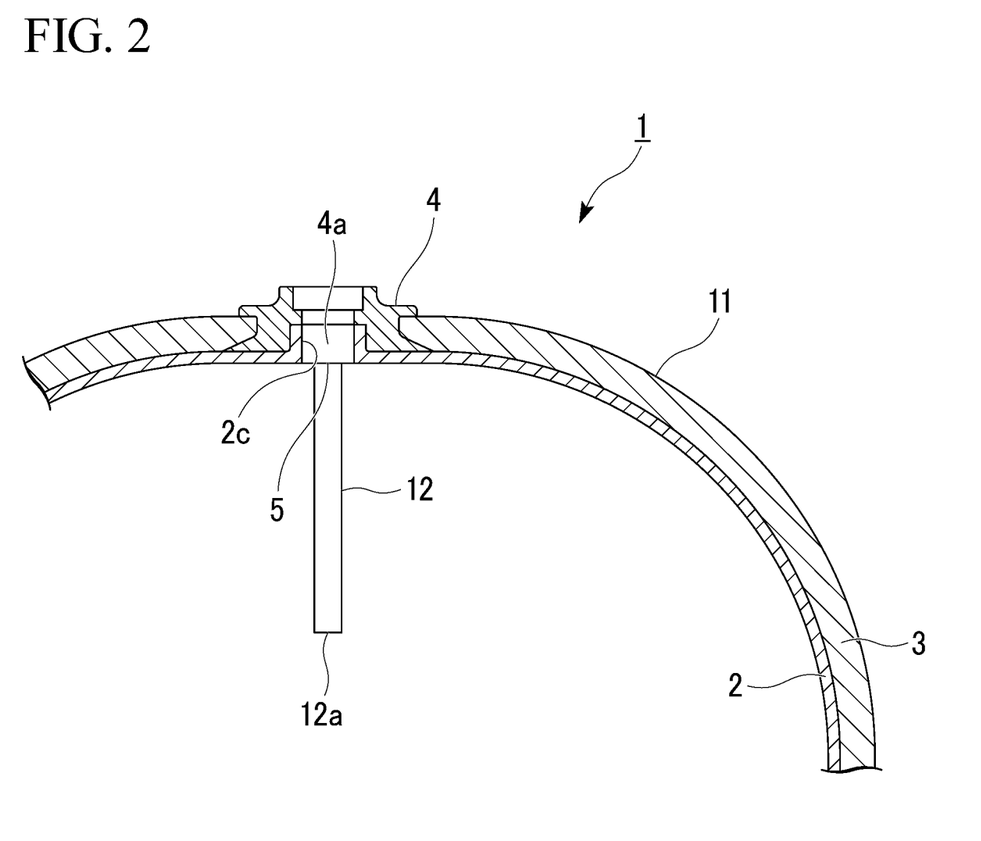
FIG. 2 is an enlarged cross-sectional view of a dome section of the pressure vessel of FIG. 1.

As shown in FIG. 1 and FIG. 2, the pressure vessel 1 of the present embodiment includes: a cylindrical straight body section 10, and hemispherical dome sections 11 which are provided at both ends of the straight body section 10 and narrow as distance from the straight body section 10 increases. The straight body section 10 and the dome sections 11 are composed of a resin main body (liner) 2, and an outer shell 3 made of a fiber reinforced resin material including a reinforced fiber and a matrix resin, the outer shell 3 being provided on the outside of the resin main body 2. Further, both of the dome sections 11 of the pressure vessel 1 are provided with metal fittings 4 at the respective tip portions thereof. The metal fittings 4 are closely fixed at the tip portions of the dome sections 11 so as to be interposed between the main body 2 and the outer shell 3.

The main body 2 is preferably a resin vessel which is a direct blow molded product from the viewpoint of productivity. The main body 2 includes a straight body section 2a, dome sections 2b, and protrusions 2c. An opening 5 communicating with the through hole 4a of the metal fitting 4 is formed at the tip of each dome section 2b of the main body 2. The protrusion 2c is a cylindrical portion provided so as to rise from the peripheral portion of the opening 5 at the tip portion of each dome section 2b over the entire circumference of the opening 5. The protrusion 2c of the main body 2 is inserted into the through hole 4a of the metal fitting 4 and is in contact with the inner surface of the through hole 4a.

Figure 3:
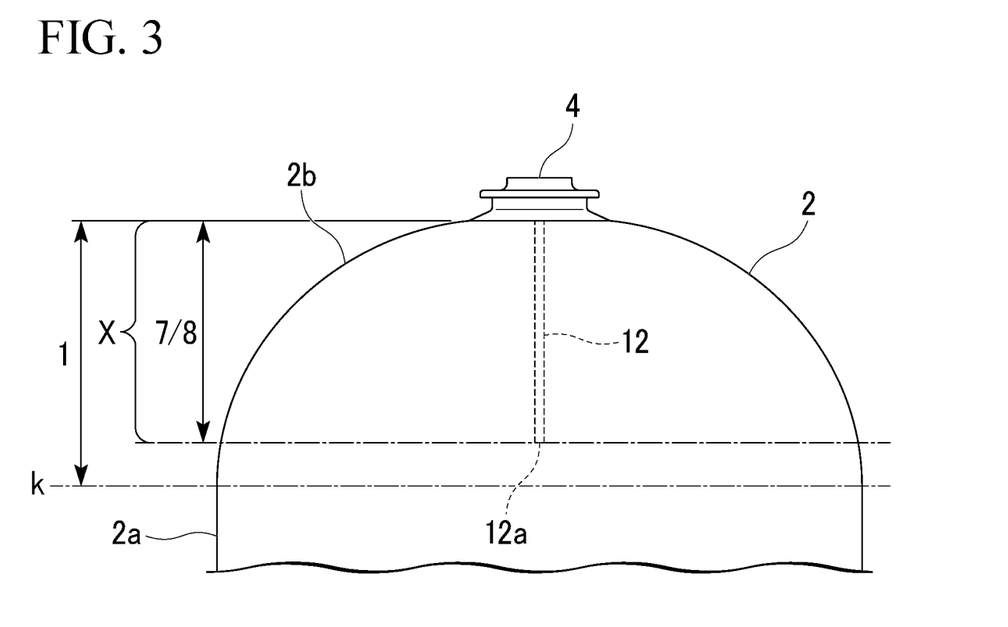
FIG. 3 is a side view showing a portion of a main body before forming an outer shell of the pressure vessel of FIG. 1, which is positioned in the vicinity of the dome section.

As shown in FIG. 3, each of the dome sections 2b of the main body 2 has a pinch-off region 12 extending linearly from a tip of the dome section 2b toward the straight body section 2a.

Figure 4:
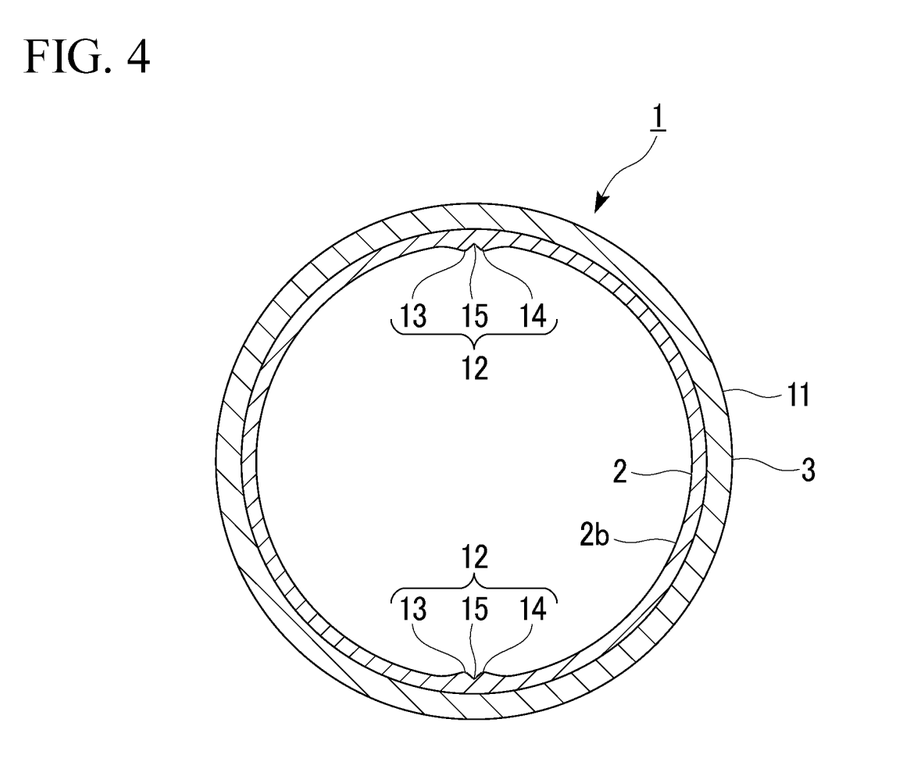
FIG. 4 is a cross-sectional view of the pressure vessel of FIG. 1 as viewed along the line I-I of FIG. 1.

The pinch-off region 12 is formed by sandwiching a part of the parison between a pair of molds that are closed from the left and right sides during the direct blow molding. Therefore, as shown in FIG. 4, two pinch-off regions 12 are formed in each of the dome sections 2b of the main body 2 at respective positions facing each other in a cross section cut in a direction perpendicular to the axial direction of the straight body section 2a.

In the pinch-off region 12, a pinch-off line 15 is formed between two thick portions 13 and 14, each of which is a ridge protruding in an arc shape toward the inside of the main body 2, and the pinch offline 15 has a valley shape. In the present invention, the term "pinch-off region" collectively refers to the pinch-off line linearly formed by sandwiching a part of a parison between a pair of molds at the time of direct blow molding, as well as the two thick portions protruding toward the inside of the main body and extending on both sides of the pinch-off line.

In the main body 2 obtained by the direct blow molding method, such a pinch-off region 12 is formed by allowing a part of the parison to be pinched between a pair of molds at the time of molding.

As shown in FIG. 3, in the axial direction of the straight body section 2a of the main body 2, the distance from the tip of each of the dome sections 2b to the boundary k between the straight body section 2a of the main body 2 and each of the dome sections 2b is assumed to be 1. Based on this assumption, in the pressure vessel 1, an end 12a of each of the pinch-off regions 12 opposite to the tip of the dome section 2b is located in a region (hereinafter also referred to as "region $X_0$") where an distance from the tip of the dome section 2b of the main body 2 in the axial direction of the straight body section 2a is less than 1. In this example, the position of the end 12a of the pinch-off region 12 on the side of the straight body section 2a coincides with the position where the distance from the tip of the dome section 2b is ⅞.

Both of the pinch-off regions 12 respectively formed on both of the dome sections 2b of the main body 2 are formed such that the end 12a opposite to the tip of the dome section 2b is located in the region $X_0$.

Since the end 12a of the pinch-off region 12 on the side of the straight body portion 2a is located in the region $X_0$, the pressure vessel has excellent durability. The reason for such effect is considered as follows.

As the thickness of the parison increases in the region which is pinched between the molds, the amount of heat stored in the resin grows greater in the dome sections than in the straight body section, and the time taken for the resin to be cooled and cured becomes longer. Thereby, in the pinch-off region formed in the dome section, the valley shape tends to become more moderate as the distance from the straight body section increases. The more moderate the valley shape of the pinch-off section, the lower the stress generated at the pinch-off line when the internal pressure of the pressure vessel is increased, so that the pressure vessel is less likely to be damaged.

In the present embodiment, since the end 12a of the pinch-off region 12 on the side of the straight body part 2a is located in the region $X_0$, the pinch-off region 12 remains within the region $X_0$ in the dome section 2b, which is remote from the straight body section 2a to some extent and where the valley shape is moderate. Therefore, even when the internal pressure of the pressure vessel 1 increases, the stress applied to the pinch-off region 12 at the pinch-off line 15 is low, whereby the main body 2 is not likely to be damaged, and excellent durability is realized.

For more easily achieving excellent durability, the position of the end 12a of the pinch-off region 12 in the region X0 is preferably in a region X (FIG. 3) at which a distance ratio between the end 12a of the pinch-off region 12 to the tip of the dome section 2b in the axial direction of the straight body section 2a of the main body 2 and the tip of the dome section to a boundary between the straight body section of the main body and the dome section in an axial direction of the straight body section is up to ⅞.

The lower limit of the distance from the tip of the dome section 2b to the end 12a of the pinch-off region 12 is not particularly limited. From the viewpoint that the strength of the main body 2 increases as the resin wall thickness variation in the direct blow molding decreases, the end 12a of the pinch-off region 12 is preferably located at a position where a distance ratio between the tip of the dome section to the end of the pinch-off region 12 opposite to the tip of the dome section on a side of the straight body section and the tip of the dome section 2b to the boundary between the straight body section of the main body and the dome section in the axial direction of the straight body section is ¹⁄₁₀ or greater.

On the inner edge of the cross-section obtained by cutting the pinch-off region in the thickness direction, a point where the pinch-off line is located is defined as point A, a point corresponding to the portion having the maximum thickness in one of the two thick portions is defined as point B, a point corresponding to the portion having the maximum thickness in another one of the two thick portions is defined as point C, a point closest to the point B among the points which are opposite to the point A across the point B and have the same thickness as the point A is defined as point D, and a point closest to the point C among the points which are opposite to the point A across the point C and have the same thickness as the point A is defined as point E. The intersection between the curve p passing through the points A and D and the normal line q with respect to the curve p passing through the point B is defined as F, and the intersection between the curve r passing through the points A and E and the normal line s with respect to the curve r passing through point C is defined as G The distance between the point A and the point F is defined as $d_{AF}$ (mm), the distance between the point F and the point D is $d_{FD}$ (mm), the distance between the point A and the point G is defined as $d_{AG}$ (mm), and the distance between the point G and the point E is $d_{GE}$ (mm). With these definitions, the pressure vessel of the present invention preferably satisfies the condition (1). Here, the curve p and the curve r are curves extending along the circular inner edge of the region free of the pinch-off region in the cross section.

$$8 \times d_{AF} \geq d_{FD}, \text{ and } 8 \times d_{AG} \geq d_{GE} \tag{1}$$

Hereinbelow, specific explanations are made taking the pressure vessel 1 as an example.

Figure 5:
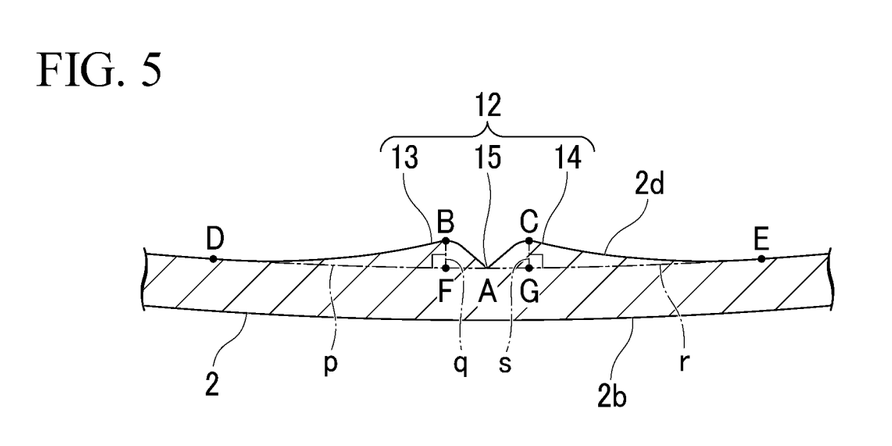
FIG. 5 is an enlarged cross-sectional view of a pinch-off region of the pressure vessel of FIG. 4.

As described above, the pinch-off region 12 is formed on the dome section 2b of the main body 2. As shown in FIG. 5, a point where the pinch-off line 15 is located on the inner edge 2d of the cross section obtained by cutting the pinch-off region 12 in the thickness direction is defined as point A. Further, a point corresponding to the maximum thickness region of the thick portion 13 on the inner edge 2d is defined as point B, and a point corresponding to the maximum thickness region of the thick portion 14 on the inner edge 2d is defined as point C. On the inner edge 2d, a point closest to the point B among the points which are opposite to the point A across the point B and have the same thickness as the point A is defined as point D, and a point closest to the point C among the points which are opposite to the point A across the point C and have the same thickness as the point A is defined as point E.

Further, the intersection between the curve p passing through the points A and D and the normal line q with respect to the curve p passing through the point B is defined as F. Also, the intersection between the curve r passing through the points A and E and the normal line s with respect to the curve r passing through point C is defined as G In the present embodiment, it is preferable that the pinch-off region 12 formed in the main body 2 satisfies the following condition (1) at all positions in the length direction of the pinch-off region 12.

$$8 \times d_{AF} \geq d_{FD}, \text{ and } 8 \times d_{AG} \geq d_{GE} \tag{1}$$

wherein $d_{AF}$ is a distance between the point A and the point F, $d_{FD}$ is a distance between the point F and the point D, $d_{AG}$ is a distance between the point A and the point G, and $d_{GE}$ is a distance between the point G and the point E.

When the pinch-off region 12 satisfies the condition (1), the valley shape of the pinch-off region 12 becomes sufficiently moderate to suppress the concentration of tearing stress, whereby a damage originating from the pinch-off line 15 of the pinch-off region 12 formed in the main body 2 is suppressed, and more excellent pressure resistance is obtained. The pinch-off region 12 is more preferably formed so as to satisfy the condition (2), and still more preferably formed so as to satisfy the condition (3), from the viewpoint that excellent pressure resistance is obtained more easily.

$$4 \times d_{AF} \geq d_{FD}, \text{ and } 4 \times d_{AG} \geq d_{GE} \tag{2}$$

$$2 \times d_{AF} \geq d_{FD}, \text{ and } 2 \times d_{AG} \geq d_{GE} \tag{3}$$

As the material of the main body (liner), a gas barrier material that does not allow leakage of high-pressure gas filled in the pressure vessel can be used, and any known material used in pressure vessels can be appropriately used. Specific examples of the material of the main body include polyolefin resins such as a high-density polyethylene resin, a cross-linked polyethylene, a polypropylene resin, and a cyclic olefin resin; polyamide resins such as nylon 6, nylon 6,6, nylon 11, and nylon 12; polyester resins such as polyethylene terephthalate, and polybutylene terephthalate; and engineering plastics such as an acrylonitrile-butadiene-styrene copolymer (ABS) resin, a polyacetal resin, a polycarbonate resin, a polyphenylene ether resin, a polyphenylene sulfide resin, a polysulfone resin, and a polyimide resin. As the resin which forms the main body, one kind may be used alone and two or more kinds may be used in combination.

Examples of the fiber reinforced composite material forming the outer shell include a fiber reinforced resin material containing a reinforcing fiber substrate in which reinforcing fibers are aligned, and a matrix resin.

Examples of the reinforcing fibers include carbon fibers, glass fibers, organic high elastic modulus fibers (such as aramid fibers and ultra high strength polyester fibers), metal fibers, and ceramic fibers. Examples of the carbon fibers include those of a pitch type, polyacrylonitrile (PAN type), a rayon type and the like. Among these, pitch type carbon fibers are preferable from the viewpoint that a particularly high elastic modulus is easily obtained, and PAN type carbon fibers are preferable from the viewpoint that high strength is easily obtained. One kind of the reinforcing fibers may be used alone, or two or more kinds thereof may be used in combination.

As the matrix resin, a thermosetting resin or a photocurable resin may be used, or a thermoplastic resin may also be used. Examples of the thermosetting resin or photocurable resin include epoxy resins, unsaturated polyester resins, urea resins, phenol resins, melamine resins, polyurethane resins, polyimide resins, and vinyl ester resins. Examples of the thermoplastic resin include polyamide resins, polyester resins such as polyethylene terephthalate and polybutylene terephthalate, engineering plastics such as ABS resin, polyetherketone and polyphenylene sulfide, and polyolefin resins such as polypropylene and poly-4-methyl-1-pentene. As the matrix resin, one kind may be used alone, or two or more kinds may be used in combination.

The metal fitting may be of any known shape of the metal fitting used for pressure vessels. The metal fitting 4 in the pressure vessel 1 has a substantially cylindrical shape having a through hole. The shape of the inner surface of the metal fitting is designed according to the shape of a valve or the like attached to the metal fitting. For example, a female screw thread may be formed on the inner peripheral surface of the through hole of the metal fitting near the upper end of the through hole so as to allow a gas supply/withdrawal valve or the like to be attached by screwing.

With respect to the metal forming the metal fitting, there is no particular limitation, and any known metal can be used. Examples of the metal include aluminum alloy, stainless steel (SUS), carbon steel, alloy steel, brass, etc.

(Method for Producing Pressure Vessel)

The direct blow molding method is employed as a method for producing the main body in the pressure vessel of the present invention. The method of forming the pinch-off region only in the region $X_0$ of the dome section of the main body is not particularly limited. Examples of the method include a method using a smaller die for extruding the parison, and a method in which the parison is pinched from upper and lower sides between a pair of molds with the width of the parison being set to be smaller than the width of the molds.

The method for molding to form a main body in which pinch-off regions formed satisfy the condition (1) is not particularly limited, and examples thereof include the same methods as described above.

For forming the outer shell, a FW method, a tape winding method, or the like can be employed. In the present invention, it is preferable to form the outer shell by the FW method. With respect to the winding method in the FW method, the tape winding method, or the like, there is no particular limitation, and examples thereof include helical winding, hoop winding, label winding, and combinations thereof.

As explained above, in the pressure vessel of the present invention, when an end of each of the pinch-off regions opposite to the tip of the dome section is located in a region where a distance from the tip of the dome section to the end of each of the pinch-off regions opposite to the tip of the dome section in the axial direction of the straight body section is less than a distance from the tip of each of the dome sections to a boundary between the straight body section of the main body and each of the dome sections in the axial direction of the straight body section. This enables the suppression of damage occurring at the pinch-off region formed in the main body, even without increasing the thickness of the main body excessively. Therefore, the pressure vessel can be reduced d have as sufficient internal capacity as well as excellent durability.

In particular, pressure vessels are required to have excellent durability in applications such as fuel tanks mounted on vehicles such as automobiles, and tanks used for storage and transportation of natural gas and hydrogen gas. Since the pressure vessel according to the first embodiment of the present invention has excellent durability, the pressure vessel is also useful for such applications.

The pressure vessel of the present invention is not limited to the pressure vessel 1 described above. For example, the pressure vessel may be one in which a metal fitting is provided only in one of the dome sections. Further, the straight body section is not limited to one having a cylindrical shape, and may, for example, has a rectangular tube shape.

Hereinbelow, the present invention will be described with reference to Examples which, however, should not be construed as limiting the present invention.

Example 1

A pressure vessel having the same configuration as the pressure vessel 1 illustrated in FIGS. 1 to 5 was produced.

As a material of a main body (liner), a high density polyethylene resin (HDPE) (4261AGBD, manufactured by Lyondellbasell) having a density of 0.945 was used. By blow molding, a main body was obtained in which the thickness of the straight body section was 6 mm, the outer diameter D of the straight body section was 793 mm, and the ratio L/D of the length L in the axial direction to the outer diameter D was 2.9.

In each of the dome sections of the main body, pinch-off regions each extending from the tip of the dome section toward the straight body section were formed. When the distance from the tip of each of the dome sections to the boundary between the straight body section of the main body and each of the dome sections was assumed to be 1, the end of each of the pinch-off regions opposite to the tip of the dome section was located at a position of 0.78 (6.24/8) in terms of a distance from the tip of the dome section in the axial direction of the straight body section. Further, the portion of the dome section of the main body dome formed under the same condition where the pinch-off region was formed was cut at a position close to the pinch-off tip on the straight body side in a direction perpendicular to the axial direction, and the shape of the pinch-off region was measured and found to satisfy $1.5 \times d_{AF} = d_{FD}$, and $1.5 \times d_{AG} = d_{GE}$. As a material of a metal fitting, aluminum alloy A6061 was used. A metal fitting was bonded to the tip of each of the dome sections of the main body using an acrylic adhesive (DP8005, manufactured by 3M).

As reinforcing fiber bundles, carbon fiber bundles (37-800-WD 30K, manufactured by Mitsubishi Rayon Carbon Fiber and Composites, tensile strength: 5520 MPa, tensile elastic modulus: 255 GPa, basis weight: 1.675 g/m) were used. As a matrix resin composition, an epoxy resin composition (LY1564/917/960-1, manufactured by Huntsman) containing a bisphenol A epoxy resin, an acid anhydride curing agent, and a curing accelerator was used. Aligned twelve carbon fiber bundles as a reinforcing fiber substrate were drawn into and immersed in the epoxy resin composition contained in a resin tank. Then, predetermined amounts of the reinforcing fiber substrate were respectively hoop wound and helically wound around the main body so as to form hands of the reinforcing fiber substrate each having a width of 32 mm on the main body. The tension applied to the reinforcing fiber substrate at the time of winding was 17 N, and the pressure inside the main body was 0.1 MPa at the start of winding and 0.3 MPa after the completion of one layer of each of hoop winding and helical winding.

After the winding, while keeping the pressure inside the main body at 0.3 MPa, the main body was heated at 65° C. for 45 minutes and further heated in a curing furnace at 95° C. for 6 hours, thereby obtaining a pressure vessel with an outer shell of reinforcing fiber material formed on the outside of the main body. The volumetric fiber content (Vf) of the carbon fibers in the outer shell calculated from the amount of fibers used and the mass of the outer shell was 60% by volume.

Comparative Example 1

A pressure vessel was produced in the same manner as in Example 1 except for the following points. In Comparative Example 1, a main body was formed such that, when the distance from the tip of each of the dome sections to the boundary between the straight body section of the main body and each of the dome sections was assumed to be 1, the end of each of the pinch-off regions opposite to the tip of the dome section was located at a position of 1.12 (8.98/8) in terms of a distance from the tip of the dome section in the axial direction of the straight body section, and the shape of the pinch-off region satisfied $9 \times d_{AF} = d_{FD}$, and $9 \times d_{AG} = d_{GE}$.

[Cycle Durability]

Each of the pressure vessels obtained above was subjected to a normal temperature/pressure cycle test (150% load of working pressure) according to ISO11515 concerning pressure vessels for transport to evaluate the durability. The evaluation results are shown in Table 1.

TABLE 1

|  | Example 1 | Example 2 |
|---|---|---|
| Distance from tip of dome section to end (opposite side) of pinch-off part | 0.78 (6.24/8) | 1.12 (8.98/8) |
| Cycle number   11250 (Usual service life) | No leakage/rupture | No leakage/rupture |
| 17608 | No leakage/rupture | Leakage occurred |
| 33750 (3-fold compared to usual service life) | No leakage/rupture |  |

As shown in Table 1, in the case of the pressure vessel of Example 1, the main body was not broken even after exceeding the target number of cycles (33750 times: expected service life (15 years)×750 cycles×3) in the normal temperature/pressure cycle test and thus had excellent durability. On the other hand, in the pressure vessel of Comparative Example 1, the pressure vessel did not rupture, but leakage occurred before reaching the same number of cycles. When the pressure vessel was disassembled, it was confirmed that a crack occurred in the pinch-off region of the main body through which the leakage occurred.

DESCRIPTION OF THE REFERENCE SIGNS

1 Pressure vessel
2 main body
2a Straight body section
2b Dome section
2c Protrusion
2d Inner edge
3 Outer shell
4 Metal fitting
4a Throughhole
5 Opening
10 Straight body section
11 Dome section

The invention claimed is:

1. A pressure vessel comprising: a cylindrical straight body section, and dome sections which are provided at both ends of the straight body section and narrow as distance from the straight body section increases, wherein:
the straight body section and the dome sections are composed of a resin main body, and an outer shell formed of a fiber reinforced resin material comprising a reinforcing fiber and a matrix resin, the outer shell being provided on the outside of the resin main body;
each dome section of the main body has pinch-off regions extending from a tip of the dome section toward the straight body section;
an end of each of the pinch-off regions opposite to the tip of the dome section is located in a region where a distance from the tip of the dome section to the end of each of the pinch-off regions opposite to the tip of the dome section in the axial direction of the straight body section is less than a distance from the tip of each of the dome sections to a boundary between the straight body section of the main body and each of the dome sections in the axial direction of the straight body section;
in each of the pinch-off regions, a pinch-off line is formed between two thick portions, each of which is a ridge protruding in an arc shape toward the inside of the main body; and
a condition (1) below is satisfied:

$$8 \times d_{AF} \geq d_{FD}, \text{ and } 8 \times d_{AG} \geq d_{GE} \quad (1),$$

wherein A, B, C, D, E, F and G are points on an inner edge of a cross-section obtained by cutting the pinch-off region in a thickness direction, wherein A is a point where the pinch-off line is located, B is a point corresponding to a portion having a maximum thickness in one of the two thick portions, C is a point corresponding to a portion having a maximum thickness in another one of the two thick portions, D is a point closest to the point B among points which are opposite to the point A across the point B and have the same thickness as the point A, E is a point closest to the point C among points which are opposite to the point A across the point C and have the same thickness as the point A, F is an intersection between a curve passing through the points A and D and a normal line (q) with respect to the curve (p) passing through the point B, and G is an intersection between a curve (r) passing through the points A and E and a normal line (s) with respect to the curve (r) passing through the point C, $d_{AF}$ is a distance (mm) between the point A and the point F, $d_{FD}$ is a distance (mm) between the point F and the point D, $d_{AG}$ is a distance (mm) between the point A and the point G, and $d_{GE}$ is a distance (mm) between the point G and the point E.

2. The pressure vessel according to claim 1, wherein a distance ratio between the tip of the dome section to the end of each of the pinch-off regions opposite to the tip of the dome section in the axial direction of the straight body section and the tip of each of the dome sections to the boundary between the straight body section of the main body and each of the dome sections in the axial direction of the straight body section is up to 7/8.

3. The pressure vessel according to claim 1, wherein the main body is a direct blow molded product.

4. The pressure vessel according to claim 1, wherein a distance ratio between the tip of the dome section to the end of each of the pinch-off regions opposite to the tip of the dome section on a side of the straight body section and the tip of each of the dome sections to the boundary between the straight body section of the main body and each of the dome sections in the axial direction of the straight body section is 1/10 or greater.

5. The pressure vessel according to claim 2, wherein the main body is a direct blow molded product.

6. The pressure vessel according to claim 2, wherein a distance ratio between the tip of the dome section to the end of each of the pinch-off regions opposite to the tip of the dome section on a side of the straight body section and the tip of each of the dome sections to the boundary between the straight body section of the main body and each of the dome sections in the axial direction of the straight body section is 1/10 or greater.

7. The pressure vessel according to claim 6, wherein the main body is a direct blow molded product.

* * * * *